United States Patent
Ohhashi et al.

(10) Patent No.: US 9,959,130 B2
(45) Date of Patent: May 1, 2018

(54) PROCESS SIMULATION FOR INFORMATION PROCESSING SYSTEM, INFORMATION PROCESSING METHOD, AND INFORMATION PROCESSING PROGRAM PRODUCT

(71) Applicants: Hideki Ohhashi, Kanagawa (JP); Kunihiro Akiyoshi, Fukouka (JP)

(72) Inventors: Hideki Ohhashi, Kanagawa (JP); Kunihiro Akiyoshi, Fukouka (JP)

(73) Assignee: RICOH COMPANY, LTD., Tokyo (JP)

( * ) Notice: Subject to any disclaimer, the term of this patent is extended or adjusted under 35 U.S.C. 154(b) by 814 days.

(21) Appl. No.: 14/483,652

(22) Filed: Sep. 11, 2014

(65) Prior Publication Data
US 2015/0081268 A1    Mar. 19, 2015

(30) Foreign Application Priority Data

Sep. 13, 2013   (JP) .................................. 2013-190396

(51) Int. Cl.
*G06F 9/455*   (2006.01)
*G06F 11/36*   (2006.01)

(52) U.S. Cl.
CPC .......... *G06F 9/45508* (2013.01); *G06F 11/36* (2013.01)

(58) Field of Classification Search
CPC ................................................. G06F 9/45504
USPC ........................................................ 703/26
See application file for complete search history.

(56) References Cited

U.S. PATENT DOCUMENTS

| 7,233,404 | B2 * | 6/2007 | Meilstrup | G06F 3/1205 358/1.13 |
| 7,554,685 | B2 | 6/2009 | Akiyoshi et al. | |
| 7,904,904 | B2 | 3/2011 | Mathiske et al. | |
| 2006/0088323 | A1 * | 4/2006 | Morisawa | G03G 15/5012 399/21 |

(Continued)

FOREIGN PATENT DOCUMENTS

| JP | H10-124343 | 5/1998 |
| JP | 2004-185595 | 7/2004 |

(Continued)

OTHER PUBLICATIONS

Office Action dated Jul. 4, 2017 in Japanese Patent Application No. 2013-190396.

*Primary Examiner* — Andy Ho
(74) *Attorney, Agent, or Firm* — Oblon, McClelland, Maier & Neustadt, L.L.P.

(57) ABSTRACT

Disclosed is an information processing system having one or more computers. The information processing system includes a request receiver configured to receive a request from a program causing an apparatus to execute a predetermined process, a simulator configured to simulate the process executed by the apparatus in accordance with the request, an instruction receiver configured to receive a status change instruction for changing a status of the simulator from a user, and a status changer configured to cause the simulator to change a status of the simulator in accordance with the status change instruction. In the information processing system, the simulator simulates the process executed by the apparatus in the status changed by the status changer.

18 Claims, 7 Drawing Sheets

(56) References Cited

U.S. PATENT DOCUMENTS

| | | | |
|---|---|---|---|
| 2013/0215467 A1* | 8/2013 | Fein | G06F 3/1204 358/1.15 |
| 2013/0227530 A1* | 8/2013 | Zhang | G06F 11/362 717/129 |
| 2014/0089538 A1* | 3/2014 | Bachrany | G06F 3/00 710/37 |

FOREIGN PATENT DOCUMENTS

| | | |
|---|---|---|
| JP | 2006-155566 A | 6/2006 |
| JP | 2006-168879 A | 6/2006 |
| JP | 2009-043078 A | 2/2009 |
| JP | 2009-506467 | 2/2009 |

* cited by examiner

FIG.5

| EVENT NAME | DISTRIBUTION DESTINATION | DISTRIBUTION PARAMETER |
|---|---|---|
| REQ_*_JOB | JOB MANAGER, SYSTEM MANAGER | ALL |
| REQ_GET_*_JOB_STATE | JOB MANAGER | ALL |
| EMULATE_JAM_CREATE | SERVICE MANAGER | ALL |
| EMULATE_JAM_RECOVER | SERVICE MANAGER | ALL |
| : | : | : |
| RES_* | RESPONSE GENERATOR | ALL |
| : | : | : |

FIG.8

| EVENT NAME | DISTRIBUTION DESTINATION | DISTRIBUTION PARAMETER |
|---|---|---|
| REQ_*_JOB | JOB MANAGER, SYSTEM MANAGER | ALL |
| REQ_GET_*_JOB_STATE | JOB MANAGER | ALL |
| EMULATE_JAM_CREATE | SERVICE MANAGER | ALL |
| EMULATE_JAM_RECOVER | SERVICE MANAGER | ALL |
| : | : | : |
| RES_* | RESPONSE GENERATOR | ALL |
| : | : | : |
| JOB_PRINT_COUNTER | STATUS CHANGER | ALL |
| SERVICE_JAM_ON | STATUS MONITOR | ALL |
| : | : | : |

120

PROCESS SIMULATION FOR INFORMATION PROCESSING SYSTEM, INFORMATION PROCESSING METHOD, AND INFORMATION PROCESSING PROGRAM PRODUCT

BACKGROUND OF THE INVENTION

1. Field of the Invention

The disclosures discussed herein relate to an information processing system, an information processing method, and an information processing program product.

2. Description of the Related Art

Image forming apparatuses such as multifunction peripherals include an application platform. Such image forming apparatuses may be designed to implement application programs (hereinafter simply called "applications") utilizing Application Program Interface (API) provided by the application platform. Publication of the API not only allows manufacturers of the image forming apparatuses to develop applications but also allows third-party vendors other than such manufacturers to develop the applications.

It is desirable to employ an image forming apparatus to check operational capabilities of the applications currently under development. In order to check operational capabilities of the applications, it is ideal to prepare an image forming apparatus for every developer of the applications in an economically efficient way. Further, in a case where two or more developers of the applications share one image forming apparatus, it is preferable to efficiently check capabilities of the applications. Hence, the developers of applications may employ software that emulates or simulates (hereinafter generically referred to as "emulate(s)") operations of hardware or an application platform of the image forming apparatus. Such software is hereinafter called an "emulator". For example, each of the developers may be able to efficiently check operational capabilities of the application currently under development by installing the emulator in his or her personal computer (PC). In addition, it may be possible to simultaneously develop a new model of the image forming apparatus and applications designed for the new model by preparing an emulator for the new model of the image forming apparatus.

RELATED ART DOCUMENT

Patent Document

Patent Document 1: Japanese Laid-open Patent Publication No. 2004-185595

SUMMARY OF THE INVENTION

Accordingly, it is a general object in one embodiment of the present invention to provide an information processing system, an information processing method, and an information processing program product capable of easily reproducing various statuses of an apparatus subject to emulation that substantially obviate one or more problems caused by the limitations and disadvantages of the related art.

In one aspect of the embodiment, there is provided an information processing system having one or more computers. The information processing system include a request receiver configured to receive a request from a program causing an apparatus to execute a predetermined process; a simulator configured to simulate the process executed by the apparatus in accordance with the request; an instruction receiver configured to receive a status change instruction for changing a status of the simulator from a user; and a status changer configured to cause the simulator to change a status of the simulator in accordance with the status change instruction. In the information processing system, the simulator simulates the process executed by the apparatus in the status changed by the status changer.

Other objects, features and advantages of the present invention will become more apparent from the following detailed description when read in conjunction with the accompanying drawings.

BRIEF DESCRIPTION OF THE DRAWINGS

FIG. 5 is a diagram illustrating a configuration example of an event distribution information storage part;

FIG. 8 is a diagram illustrating modification of a stored content of the event distribution information storage part.

DETAILED DESCRIPTION OF THE PREFERRED EMBODIMENTS

The related art emulators are not designed for changing various statuses of the image forming apparatus subject to emulation at users' desired timing. Hence, it is desirable that operational capabilities of the applications be checked in various statuses, such as a paper jam status, an out-of-toner status, and an out-of-sheet status in the related art emulators. This may be applied to apparatuses other than the image forming apparatus.

Figure 1:
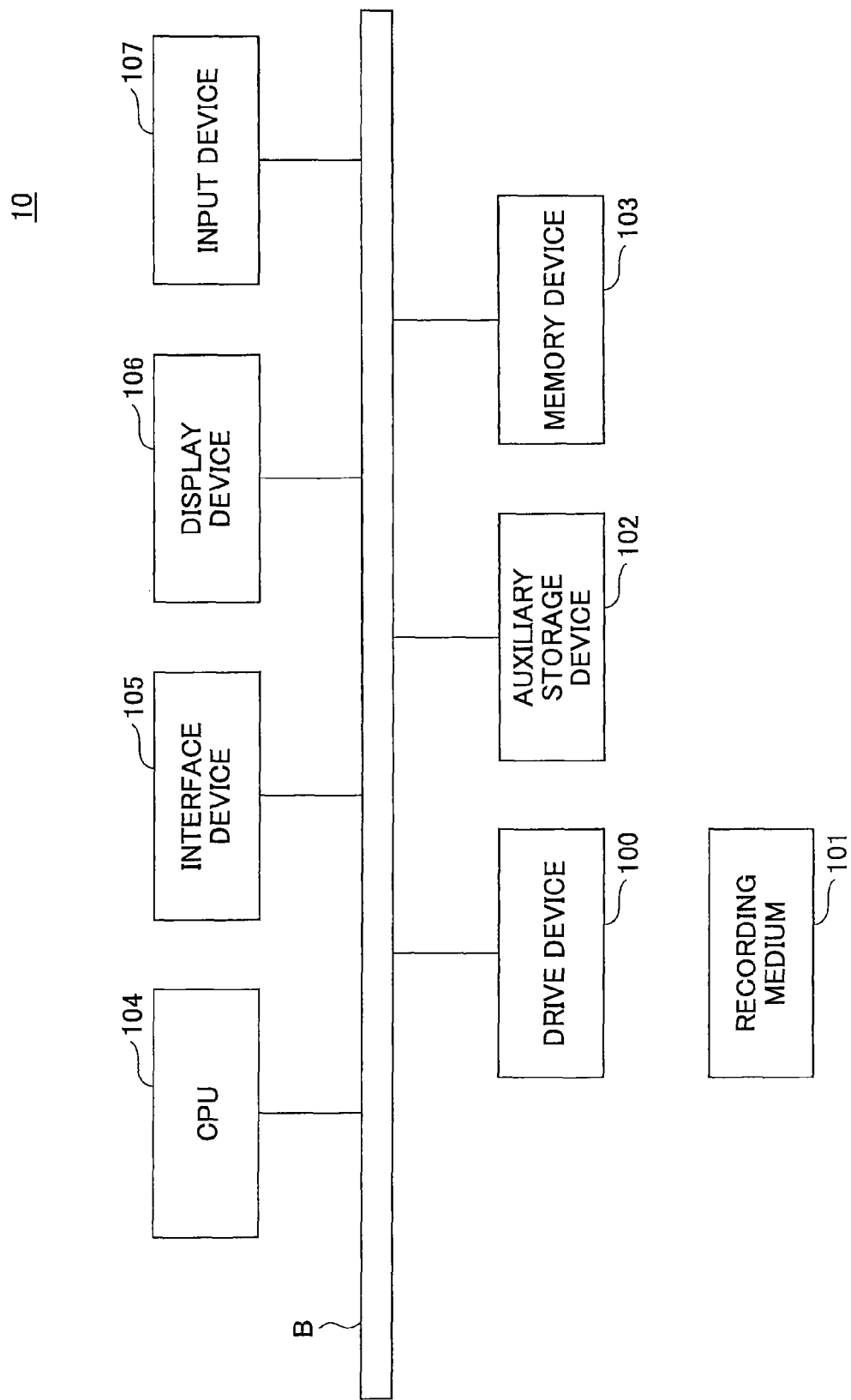
FIG. 1 is a diagram illustrating a hardware configuration example of an information processing apparatus according to an embodiment.

In the following, a description is given of embodiments with reference to accompanying drawings. FIG. 1 is a diagram illustrating a hardware configuration example of an information processing apparatus according to an embodiment. As illustrated in FIG. 1, an information processing apparatus 10 includes a drive device 100, an auxiliary storage device 102, a memory device 103, a CPU 104, an interface device 105, a display device 106, and an input device 107 that are connected to one another via a bus B.

Programs implementing processes in the information processing apparatus 10 are provided in a form of a recording medium 101 such as a CD-ROM. When the recording medium 101 storing the programs is set in the drive device 100, the programs are installed from the recording medium 101 in the auxiliary storage device 102 via the drive device 100. Note that the programs are not necessarily installed from the recording medium 101, and may be downloaded from another computer via a network. The auxiliary storage device 102 is configured to store installed program as well as storing necessary files, data, and the like.

The memory device 103 is configured to retrieve the programs from the auxiliary storage device 102 and store the retrieved programs when receiving a program activation instruction. The CPU 104 is configured to implement functions associated with the information processing apparatus 10 according to the programs stored in the memory device 103. The interface device 105 is configured to serve as an interface for connecting the information processing apparatus 10 to a network. The display device 106 is configured to display a graphic user interfaces (GUI) based on programming. The input device 107 is composed of a keyboard, a mouse, and the like, and is used by a user to input various operating instructions.

Note that the information processing apparatus 10 may be a computer system formed of a group including one or more configurations illustrated in FIG. 1.

Figure 2:
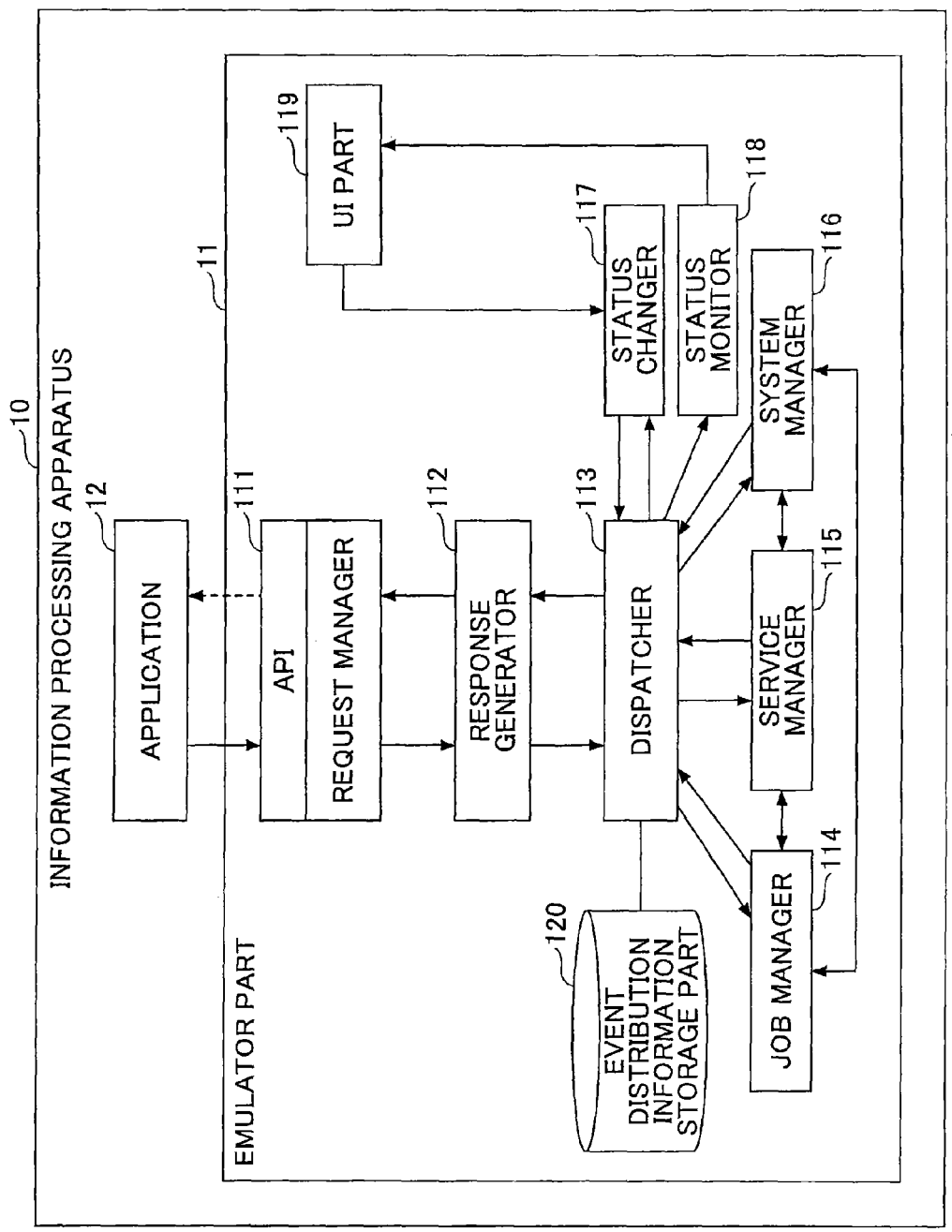
FIG. 2 is a diagram illustrating a functional configuration example of the information processing apparatus according to the embodiment.

FIG. 2 is a diagram illustrating a functional configuration example of the information processing apparatus according to the embodiment. In FIG. 2, the information processing apparatus 10 includes an emulator part 11. Further, the information processing apparatus 10 installs one or more applications 12. The application 12 indicates an application program operable in an application platform of the image forming apparatus (hereinafter called a "target apparatus") that is emulated by the emulator part 11. That is, the emulator part 11 is configured to emulate (simulate) an application platform of the target apparatus, operations of hardware of the target apparatus, and the like. Hence, the emulator part 11 may be able to provide the application 12 with an operating environment similar to the target apparatus. The emulator part 11 is implemented by the programs installed in the information processing apparatus 10 to cause a CPU 104 to execute processes. Note that the term "emulate" or "imitate" includes the meaning of "simulate".

In FIG. 2, the emulator part 11 includes a request manager 111, a response generator 112, a dispatcher 113, a job manager 114, a service manager 115, a system manager 116, a status changer 117, a status monitor 118, a user interface (UI) part 119, and the like.

The request manager 111 includes an application program interface (API) similar to an API provided with the application platform of the target apparatus, and is configured to receive a request from the application 12 via the API. The API may be a function, a method, or a Web API. Note that the Web API indicates an API utilizing a hypertext transfer protocol (HTTP) communications. Note that the Web API may use communication protocols other than the HTTP.

The response generator 112 is configured to execute a process for generating a response to a request from the application 12. The response generator 112 reports a request from the application 12 to the dispatcher 113.

The dispatcher 113 is configured to serve as an intermediate function for distributing or reporting various types of events reported from the response generator 112, the job manager 114, the service manager 115, the system manager 116, the status changer 117, and the status monitor 118 by referring to the event distribution information storage part 120. The event indicate information associated with an event that has occurred while the emulator part 11 emulates operations of the target apparatus, or information indicating an occurrence of the event. The event distribution information storage part 120 is configured to store information (hereinafter called "event distribution information") indicating an event distribution destination (a reporting destination) of the event, for each type of the event. The event distribution information may indicate an event subject to being distributed to each of the components of the emulator part 11. The event distribution information storage part 120 may be implemented by utilizing a storage device, and the like that are connected, for example, to the auxiliary storage device 102 or the information processing apparatus 10 via the network. The dispatcher 113 mediates distribution of an event so as to reduce the significance of acknowledging a distribution destination of an event imposed on each of the components (each of modules). As a result, when a certain distribution destination of an event needs to be changed, it is possible to reduce the significance of modifying modules and the like of a reporting source of the event.

The job manager 114 is configured to emulate management such as execution of a job in the target apparatus. The job manager 114 includes a module to manage a job associated with each type of job. For example, the target apparatus capable of executing a copy job, a scan job, a FAX job, and a print job, the job manager 114 includes a module for each of the copy job, the scan job, the FAX job, and the print job. The job manager 114 is further configured to report an event associated with a change of a job status.

The service manager 115 is configured to emulate a control mechanism of hardware (an engine part) of the target apparatus that is used according to the execution of a job. The control mechanism may, for example, be a driver program corresponding to hardware. The service manager 115 is configured to report an event associated with a change in a hardware status of the target apparatus. Examples of such a change in the hardware status include an out-of-toner status, a paper jam status, a scan start or end status, a print start or end status, and the like.

The system manager 116 is configured to emulate management of a target apparatus status that changes independently from the execution of a job. Examples of such a target apparatus status include a user's login status, an energy saving status, and the like. The system manager 116 is further configured to report an event associated with a change in the target apparatus status.

The status changer 117 is configured to forcefully change a status of the emulator part 11 in response to a request from the UI part 119 at a timing instructed by the user. For example, the status changer 117 forcefully generates the out-of-toner status, the paper jam status, and the like. Further, the status changer 117 may forcefully set the number of sheets in a virtual sheet feeding tray, or forcefully set information of a login user. The emulator part 11 is configured to emulate a process executed by the target apparatus in the status changed by the status changer 117.

The status monitor 118 is configured to report an event that has occurred in the emulator part 11 to the UI part 119.

The UI part 119 is configured to provide a user interface. For example, the UI part 119 causes the display device 106 to display a screen so as to receive an instruction to change a status of the emulator part 11 via the screen. The UI part 119 also reports the event that has occurred in the emulator part 11 to a user via the screen.

Note that the job manager 114, the service manager 115, and the system manager 116 may require high real-time performance in the target apparatus. Hence, a specific event may be directly exchanged between these modules.

Figure 3:
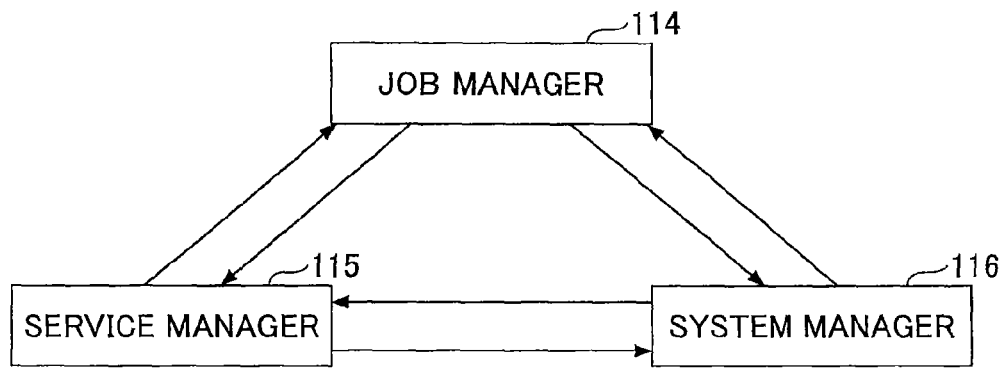
FIG. 3 is a diagram illustrating a configuration in which an event is directly reported between modules.

FIG. 3 is a diagram illustrating a configuration in which an event is directly reported between the modules. For example, an event that requires real-time performance in the target apparatus may be directly exchanged between the modules without being mediated by the dispatcher 113 as illustrated in FIG. 3. Accordingly, operations of the emulator part 11 may be more analogous to the target apparatus. Note that arrows in FIG. 3 indicate an event.

Figure 4:
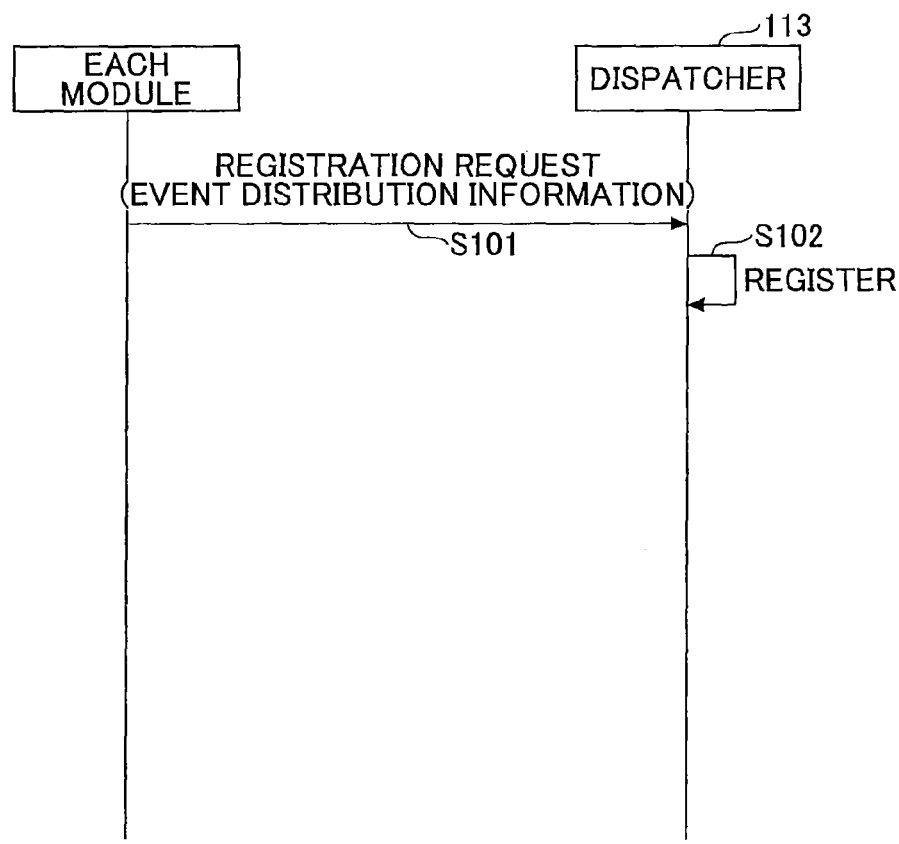
FIG. 4 is a sequence diagram illustrating an example of an event distribution information registration process.

A description is given below of a process executed by the information processing apparatus 10. FIG. 4 is a sequence diagram illustrating an example of an event distribution information registration process. The modules in FIG. 4 indicate the job manager 114, the service manager 115, the system manager 116, and the response generator 112. The process of FIG. 4 is executed at the activation of each of the modules.

In step S101, each of the modules transmits to the dispatcher 113 an event distribution information registration request including a corresponding one of module identification information and event identification information (hereinafter called an "event name") to be distributed to the corresponding module. The dispatcher 113 registers (or stores) the event distribution information included in the event distribution information registration request into the event distribution information storage part 120 (step S102).

FIG. 5 is a diagram illustrating a configuration example of the event distribution information storage part 120. In FIG. 5, the event distribution information storage part 120 stores each of records in association with an event name, a distribution destination, a distribution parameter, and the like.

The event name indicates an event subject to distribution. The distribution destination indicates identification information of a destination of a distributed event associated with the event name (i.e., a reporting source of the event). Of the parameters accompanying an event, the distribution parameter indicates a parameter to be distributed to the distribution destination together with the event. In the distribution parameter 120 in FIG. 5, "ALL" indicates distribution of all the parameters. The distribution parameter is a component of the event distribution information and included in the registration request from each of the modules.

As illustrated in FIG. 5, regular expressions may be specified to the event name. For example, "REQ_*_JOB" indicates a group of "REQ_COPY_JOB", "REQ_SCAN_JOB", "REQ_FAX_JOB", "REQ_PRINT_JOB", and the like. "REQ_*_JOB" indicates a job execution request for executing the type of the job identified by a part of "*". Further, "REQ_GET_*_JOB_STATE" indicates a job status acquisition request for acquiring the type of the job identified by a part of "*". Note that the event name starting with "REQ" is an event name of an event indicating a request (hereinafter called a "request event") reported from the request manager 111 in response to a request from the application 12. On the other hand, the event name starting with "RES" is an event name of an event reported as a response (hereinafter called a "response event") corresponding to the request event.

In FIG. 5, "REQ_*_JOB" and "REQ_GET_*_JOB_STATE" are distributed in the job manager 114. That is, the job manager 114 has requested distribution of "REQ_*_JOB" and "REQ_GET_*_JOB_STATE". Since the job execution and the job status are managed by the job manager 114, "REQ_*_JOB" and "REQ_GET_*_JOB_STATE" need to be distributed to the job manager 114.

On the other hand, FIG. 5 illustrates that "RES_*" is distributed to the response generator 112. That is, the response generator 112 has requested distribution of "RES_*". The response generator 112 generates information indicating a response (hereinafter called "response information") corresponding to a request from the application based on the response event. Hence, "RES_*" needs to be distributed to the response generator 112.

Further, "EMULATE_JAM_CREATE" is an event name of an event (hereinafter called a "paper jam generation instruction event") indicating a pseudo-paper jam or virtual paper jam generation instruction (an instruction to transition to the paper jam status). "EMULATE_JAM_RECOVER" is an event name of an event (hereinafter called a "paper jam fix instruction") indicating a pseudo-paper jam or virtual paper jam fix instruction (an instruction to recover from the paper jam status). In FIG. 8, the paper jam generation instruction event and paper jam fix event are distributed to the service manager 115. That is, the service manager 115 has requested distribution of the paper jam generation instruction event and paper jam fix event. Pseudo-generation or virtual generation of paper jam is implemented by the service manager 115.

Note that when the registration request for registering the event distribution information associated with the same event name received from two or more modules, the two or more modules are registered as distribution destinations corresponding to the same event name. That is, one event may be distributed to two more modules. For example, the system manager 116 is registered in association with "REQ_*_JOB" as well as the job manager 114. This indicates that the system manager has also requested distribution of "REQ_*_JOB. For example, when the emulator part 11 is in the energy-saving mode, "REQ_*_JOB" needs to be distributed to the system manager 116 to restore the emulator part 11 from the energy-saving mode for executing a job.

Note that in the operating process of the emulator part 11, reporting of a certain event may fluctuate in a certain module. That is, a certain event sometimes needs to be reported or sometimes does not need to be in a certain module. For example, when there is a job in execution or a spooled job, the job manager 114 needs to receive an event reported from the service manager 115. However, when there is no job in execution or no spooled job, the job manager 114 does not need to receive the event. In this case, the job manager 114 may transmit to the dispatcher 113 a registration request for registering the event distribution information associated with an event that needs to be distributed when a corresponding job is generated. Further, when there is no job in execution or no spooled job, the job manager 114 may transmit to the dispatcher 113 a registration cancelling request for cancelling the event distribution information associated with the event that does not need to be distributed. The dispatcher 113 deletes a record associated with the registration cancelling request from the event distribution information storage part 120.

That is, the registration or deletion of the event distribution information may be performed at any timing desired by each of the modules. Hence, the dispatcher 113 may be able to distribute an event necessary for each of the modules when a corresponding one of the modules needs to have that event.

Note that the status changer 117 and the status monitor 118 may transmit to the dispatcher 113 a registration request for registering the event distribution information basically according to a user's instruction. However, when there is no user's instruction but there is an event necessary for implementing a function of the status changer 117 or the status monitor 118, the status changer 117 and the status monitor 118 may be included in each of the modules illustrated in FIG. 4.

Note that reporting an event and responding to the event are not necessarily performed asynchronously. For example, an event may be reported to each of the modules by retrieving a function, a method, and the like.

Figure 6:
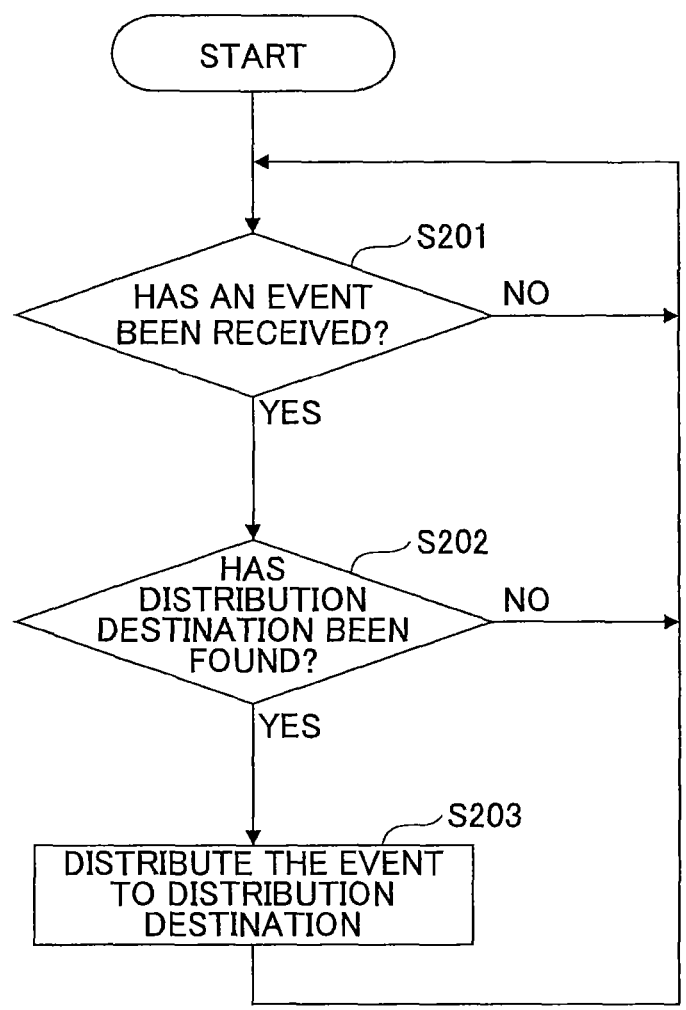
FIG. 6 is a flowchart illustrating an example of an event distribution process.

Next, a description is given of an event distribution process performed by the dispatcher 113. FIG. 6 is a flowchart illustrating an example of an event distribution process.

The dispatcher 113 is in a standby mode to receive an event from each of the response generator 112, the job manager 114, the service manager 115, and the system manager 116 (step S201). When receiving an event from any one of the response generator 112, the job manager 114, the service manager 115, and the system manager 116 ("YES" in step S201), the dispatcher 113 determines whether there is a distribution destination of the received event by referring to the event distribution information storage part 120 (see FIG. 5) (step S202). Specifically, a record having the event name of the received event is searched for in the event distribution information storage part 120. When such a record is found, the dispatcher 113 determines that there is a distribution destination of the received event. When such a record is not found, the dispatcher 113 determines that there is no distribution destination of the received event.

When the record is found ("YES" in step S202), the dispatcher 113 distributes the received event to a module specified based on the distribution destination of the record found in step S202 (step S203). Further, the dispatcher 113 distributes a parameter corresponding to the distribution parameter of the record to the specified module.

On the other hand, when the record is not found ("NO" in step S202), the dispatcher 113 does not distribute the received event.

Figure 7:
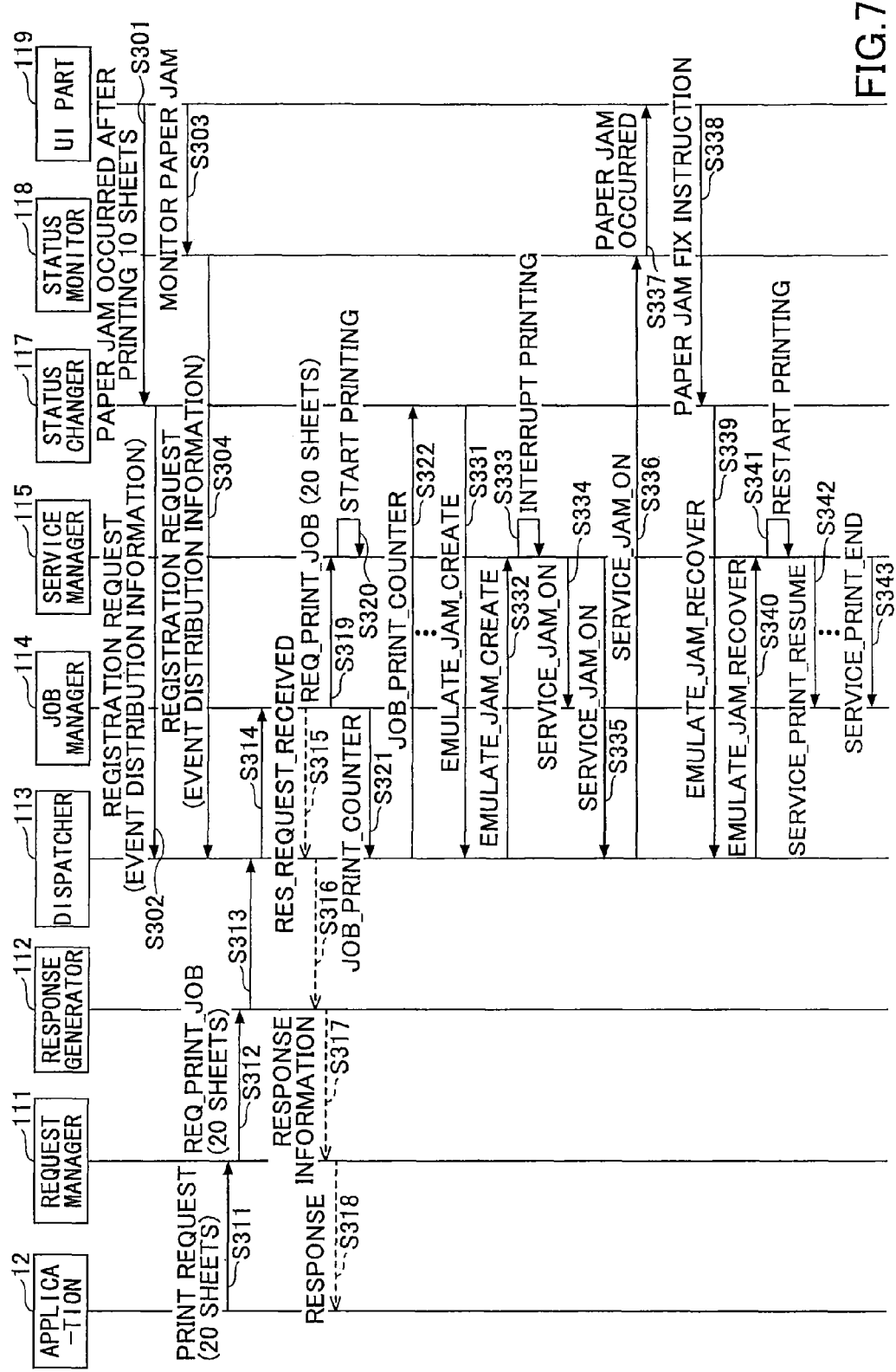
FIG. 7 is a sequence diagram illustrating an example of a process to be executed for checking operation capabilities of an application.

Next, a distribution is given of a process to be executed for checking the operation capabilities of the application 12 utilizing the emulator part 11. FIG. 7 is a sequence diagram illustrating an example of a process to be executed for checking operation capabilities of an application.

When receiving a status change instruction to forcefully change the status of the emulator part 11 via a screen presented on the display device 106, the UI part 119 transmits the received status change instruction to the status changer 117 (step S301). The received status change instruction may include a specified timing for changing the status. FIG. 7 includes an example of the status change instruction to generate a paper jam (a previous status is changed to a paper jam status) at the time after ten sheets have been printed. The status changer 117 transmits to the dispatcher 113 a registration request for registering event distribution information associated with an event, such that the dispatcher 113 receives the event for detecting or identifying the specified timing according to the status change instruction (step S302). Specifically, a registration request for registering the event distribution information associated with a print counter event ("JOB_PRINT_COUNTER") is transmitted to the dispatcher 113. The print counter event indicates an event that is reported from the job manager 114 to the dispatcher 113 every time a value of a print counter increments. The print counter indicates a storage area of the target apparatus in which the accumulated number of printed sheets. Note that the event name starting with "JOB" indicates an event that is reported from the job manager 114.

Subsequently, when receiving a monitoring instruction to monitor the status of the emulator part 11 via the screen presented on the display device 106, the UI part 119 transmits the received monitoring instruction to the status changer 118 (step S303). FIG. 7 includes an example of the monitoring instruction to monitor a paper jam. The status changer 118 transmits to the dispatcher 113 a registration request for registering event distribution information associated with an event, such that the dispatcher 113 receives the event for detecting or identifying the paper jam according to the monitoring instruction (step S304). Specifically, a registration request for registering the event distribution information associated with a paper jam event ("SERVICE_JAM_ON") is transmitted to the dispatcher 113. The paper jam event indicates an event that is reported from the service manager 115 when a paper jam has occurred. Note that the event name starting with "SERVICE" indicates an event that is reported from the service manager 115.

As a result of the process described above, the stored content of the event distribution information storage part 120 is changed to that illustrated in FIG. 8.

FIG. 8 is a diagram illustrating modification of a stored content of the event distribution information storage part 120. In FIG. 8, a record associated with "JOB_PRINT_COUNTER" and a record associated with "SERVICE_JAM_ON" are newly added to the event distribution information storage part 120.

Subsequently, when a user inputs an instruction addressed to the application 12, the application 12 executes a process according to a logic implemented in the application 12. For example, the application 12 a HTTP request indicating a print request for printing certain document data to the request manager 111 (step S311). The print request includes a print condition. In FIG. 7, the number of printing sheets being 20 is specified as a part of the print condition. Note that document data subject to printing, the print condition, and the like may be set in the application 12 by the user's operation. Further, a request from the application 12 to the request manager 111 may be identified by a uniform resource locator (URL).

The request manager 111 converts the request indicated by a URL into an event, and reports the event to the response generator 112 (step S312). In the present embodiment, an event name of an event indicating a print request (hereinafter called a "print request event") is assumed to be "REQ_PRINT_JOB". Further, this event includes the print condition.

Subsequently, the response generator 112 reports the print request event to the dispatcher 113 (step S313). The dispatcher 113 executes an event distribution process (see FIG. 6) in response to the receipt of the print request event. As a result, the print request event is distributed to the job manager 114 (step S314). Note that according to FIG. 8, the print request event ("REQ_PRINT_JOB") is also distributed to the system manager 116. However, the illustration of the distribution to the system manager 116 is omitted from FIG. 7 for convenience.

the job manager 114 reports to the dispatcher 113 a response event indicating that the print request event is normally received ("RES_REQUEST_RECEIVED") (step S315). The dispatcher 113 executes an event distribution process (see FIG. 6) in response to the receipt of the response event. As a result, the response event is distributed to the response generator 112 (step S314).

The response generator 112 reports the print request event to the dispatcher 113 in step S313, and is then in a standby mode to receive an event including information necessary for a response to the print request event. For example, the response generator 112 has detected a data structure of response information corresponding to the print request, and acquires a memory area corresponding to the data structure in the memory device 103. The response generator 112 stores a value indicating a response event in a part (a variable) corresponding to the memory area every time the response event is reported from the dispatcher 113. The response generator 112 cancels the standby mode, and returns the response information stored in the memory area to the request manager 111 when all the values are input as the variables constituting the memory area.

The response generator 112 performs the above process because the request event reported from the response generator 112 to the dispatcher 113 may be distributed to two or more modules, and response events from the two or more modules may be returned asynchronously. In the example illustrated in FIG. 7, the response generator 112 returns the response information to the request manager 111 when the response event from the job manager 114 is distributed to the response generator 112 (step S317).

However, when the status of the emulating part is successively requested, the response generator 112 may return the response information to the application 12 without being in the standby mode.

Subsequently, the request manager 111 returns the HTTP response including the response information to the application 12 (step S318).

On the other hand, the job manager 114 directly reports, after having reported the response event corresponding to the print request (step S315), the print request event to the service manager 115 (step S319). Note that the service manager 115 may be registered as the distribution destination corresponding to the print request event in the event distribution information storage part 120 in advance, and the print request event may be distributed from the dispatcher 113 to the service manager 115 together with the job manager 114 in step S315. In this case, step S319 does not need to be executed.

The service manager 115 starts pseudo-printing or virtual printing corresponding to the print request event (step S320). The pseudo-printing or virtual printing may be implemented by updating a value of the parameter that needs to be varied with execution of printing. For example, the print counter updates (increments) the value of the parameter with a period adequate to print execution speed of one sheet.

The job manager 114, on the other hand, monitors the print counter. The job manager 114 reports the print counter event ("JOB_PRINT_COUNTER") to the dispatcher 113 every time the value of the print counter is incremented by one (step S321). The dispatcher 113 executes an event distribution process (see FIG. 6) in response to the receipt of the print counter event. As a result, the print counter event is distributed to the status changer 117 (step S322).

In the present embodiment, the status changer 117 reports a paper jam generation instruction event ("EMULATE_JAM_CREATE") to the dispatcher 113 at the time when steps S321 and S322 are repeatedly executed ten times (i.e., ten sheets are printed) (step S331). That is, a timing for reporting the paper jam generation instruction event is specified based on the print counter event. Note that in a step preceding or subsequent to step S331, the status changer 117 may request the dispatcher 113 to cancel distribution of the print counter event. In the present embodiment, the status changer 117 may only detect that ten sheets have been printed because the status changer 117 does not need distribution of the subsequent print counter event.

The dispatcher 113 executes an event distribution process (see FIG. 6) in response to the receipt of the paper jam generation instruction request event. As a result, the paper jam generation instruction event is distributed to the service manager 115 (step S332).

The service manager 115 interrupts pseudo-printing or virtual printing in response to the receipt of the paper jam generation instruction event (step S333). As a result, updating of various types of parameters such as that of the print counter is stopped. Subsequently, the service manager 115 reports a paper jam event ("SERVICE_JAM_ON") to the job manager 114 (step S334). The job manager 114 may, for example, terminate monitoring the print counter in response to the receipt of the paper jam event. Subsequently, the service manager 115 reports the paper jam event to the dispatcher 113 (step S335).

The dispatcher 113 executes an event distribution process (see FIG. 6) in response to the receipt of the paper jam event. As a result, the paper jam event is distributed to the status monitor 118 (step S336). The status monitor 118 reports the occurrence of the paper jam to the UI part 119 (step S337). The UI part 119 may, for example, display a message indicating the occurrence of the paper jam.

When the user who has received the message inputs a paper jam fix instruction via the screen presented on the display device 106, the UI part 119 transmits the paper jam fix instruction to the status changer 117 (step S338). Inputting the paper jam fix instruction corresponds to pseudo-removal or virtual removal of jammed paper.

The status changer 117 reports a paper jam fix instruction event ("EMULATE_JAM_RECOVER") to the dispatcher 113 according to the paper jam fix instruction (step S339). The dispatcher 113 executes an event distribution process (see FIG. 6) in response to the receipt of the paper jam fix instruction event. As a result, the paper jam fix instruction event is distributed to the service manager 115 (step S340).

The service manager 115 restarts pseudo-printing or virtual printing in response to the receipt of the paper jam fix instruction event (step S341). Subsequently, the service manager 115 directly reports a print restart event ("SERVICE_PRINT_RESUME") to the job manager 114 (step S342). The job manager 114 restarts monitoring the print counter in response to the receipt of the print restart event. As a result, steps S321 to S322 are repeatedly executed. Note that when the status changer 117 has already requested the dispatcher 113 to cancel distribution of the printer counter event, step S322 will not be executed.

Subsequently, when 20 sheets have been printed, the service manager 115 reports a print end event ("SERVICE_PRINT_END") to the job manager 114 (step S343).

Note that in FIG. 7, the application 12 may be implemented such that the application 12 monitors a job status after receiving the response in step S318. In this case, the user may be able to check whether the application 12 operates as the user has expected according to the occurrence of the paper jam or the paper jam fix result. Alternatively, an application 12 subject to an operation capability check may be prepared separately from the application 12 in FIG. 7. That is, when the application 12 in FIG. 7 is already executing printing operations, and the paper jam has occurred during the printing operations, it may be possible to check whether the effect of the paper jam on the application 12 subject to an operation check that operates in parallel with the application 12 in FIG. 7 is as the user has expected.

Further, FIG. 7 illustrated a process corresponding to a certain scenario, a process capable of being executed in the information processing apparatus 10 of the embodiment is not limited to that illustrated in FIG. 7. For example, the status changer 117 may generate various events such as out-of-toner or out-of-sheet events that may occur in the target apparatus. Further, a request from the application 12 is not limited to the print request. The request manager 111 may receive various requests acceptable via an API (i.e., API provided by the application platform of the target apparatus) included in the request manager 111.

As described above, according to the present embodiment, the user may be able to forcefully change the status of the emulator part 119 via the UI part 119 and the status changer 117 at a desired timing. Hence, the user may be able to easily reproduce various statuses that may possibly occur in the target apparatus, and determine operation capabilities of the application 12 in each of such statuses.

Moreover, distribution of an event from each of the modules is mediated by the dispatcher 113 based on the event distribution information storage part 120. Hence, it may be possible to reduce the significance of the change in the source code in each of the modules along with the change of the event distribution destination.

Note that the present embodiment illustrates an example in which the apparatus (the target apparatus) emulated by the emulator part 11 is an image forming apparatus. However, the apparatus emulated by the emulator part 11 may be an apparatus other than the image forming apparatus such as a projector, a teleconferencing system, a digital still camera, or the like.

In addition, the function of the information processing apparatus 10 according to the embodiment may be provided as a service provided by a cloud service or an application service provider (ASP), or a Web service, or the like utilized via a network. In this case, the application 12 may be installed in a user's side personal computer (PC) connected to the information processing apparatus 10 via a network, or may be uploaded into the information processing apparatus 10.

Note that in the above embodiment, the information processing apparatus 10 is an example of an information processing apparatus or an information processing system. The request manager 111 is an example of a request receiver. The emulator part 11 is an example of a simulator. The UI part 119 is an example of an instruction receiver or a user reporter. The dispatcher 113 is an example of a distributer. The event distribution information storage part 120 is an example of a storage. The job manager 114 and the service manager 115 are examples of a component. Note that in the above embodiments, the meaning of the "emulator part" or the "emulator" may indicate the meaning of a "simulator part" or the "simulator", and the meaning of "emulate" may indicate the meaning of "simulate". Hence, when the simulator or the simulator part is the emulator or the emulator part, the emulator or the emulator part operates as the simulator or the simulating part.

The above-described embodiments may reproduce various statuses of the apparatus subject to simulation.

The embodiments of the present invention are described above. However, the present invention is not limited to the specifically disclosed embodiments, and variations and modifications may be made without departing from the scope of the present invention.

The present application is based on Japanese Priority Application No. 2013-190396 filed on Sep. 13, 2013, the entire contents of which are hereby incorporated herein by reference.

What is claimed is:

1. An information processing system having one or more computers, the information processing system comprising:
a request receiver configured to receive a request from a program causing an apparatus to execute a predetermined process;
a simulator configured to simulate the process executed by the apparatus in accordance with the request;
an instruction receiver configured to receive a status change instruction for changing a status of the simulator from a user; and
a status changer configured to cause the simulator to change a status of the simulator in accordance with the status change instruction,
wherein the simulator simulates the process executed by the apparatus in the status changed by the status changer, and
wherein the status changer enables execution of another predetermined process, the status of the simulator being changed to simulate the another predetermined process while the process is executed and cancellation of the process is executed.

2. The information processing system as claimed in claim 1, further comprising:
a distributer configured to distribute to the status changer information associated with an event occurring in a course of the simulator simulating the process executed by the apparatus,
wherein the status changer causes the simulator to change the status of the simulator in accordance with the status change instruction at a timing specified based on the information distributed from the distributer.

3. The information processing system as claimed in claim 2, wherein the distributer refers to a storage storing information indicating events subject to being distributed to the status changer, and distributes to the status changer information associated with a specific one of the events occurring in the course of the simulator simulating the process executed by the apparatus in accordance with the request.

4. The information processing system as claimed in claim 2, wherein the simulator includes a plurality of components, and the distributer distributes the request received by the request receiver to the components specified by referring to a storage, the storage storing information indicating the request subject to being distributed to each of the components.

5. The information processing system as claimed in claim 1, further comprising:
a reporter configured to report to the user information associated with an event occurring in a course of the simulator simulating the process executed by the apparatus.

6. The information processing system as claimed in claim 1, wherein, when the simulator is an emulator, the emulator operates as the simulator.

7. An information processing method executed by a computer, the information processing method, comprising:
causing a request receiver of the computer to receive a request from a program causing an apparatus to execute a predetermined process;
causing a simulator of the computer to simulate the process executed by the apparatus in accordance with the request;
causing an instruction receiver of the computer to receive a status change instruction for changing a status of the simulator from a user; and
causing a status changer of the computer to cause the simulator to change a status of the simulator in accordance with the status change instruction,
wherein the simulator simulates the process executed by the apparatus in the status changed by the status changer, and
wherein the status changer enables execution of another predetermined process, the status of the simulator being changed to simulate the another predetermined process while the process is executed and cancellation of the process is executed.

8. The information processing method as claimed in claim 7, further comprising:
   causing a distributer of the computer to distribute to the status changer information associated with an event occurring in a course of the simulator simulating the process executed by the apparatus,
   wherein the status changer causes the simulator to change the status of the simulator in accordance with the status change instruction at a timing specified based on the information distributed from the distributer.

9. The information processing method as claimed in claim 8, wherein the causing the distributer of the computer to distribute to the status changer includes causing the distributer to refer to a storage storing information indicating events subject to being distributed to the status changer, and to distribute to the status changer information associated with a specific one of the events occurring in the course of the simulator simulating the process executed by the apparatus in accordance with the request.

10. The information processing method as claimed in claim 8, wherein the simulator includes a plurality of components, and the causing the distributer of the computer to distribute to the status changer includes causing the distributer to distribute the request received by the request receiver to the components specified by referring to a storage, the storage storing information indicating the request subject to being distributed to each of the components.

11. The information processing method as claimed in claim 7, wherein the computer includes a reporter, and the reporter reports to the user information associated with an event occurring in a course of the simulator simulating the process executed by the apparatus.

12. The information processing method as claimed in claim 7, wherein, when the simulator is an emulator, the emulator operates as the simulator.

13. A non-transitory computer readable media storing a computer program product executed on a computer, the computer program product, when executed on the computer, causing the computer to serve as following functions, the functions comprising:
   a request receiver configured to receive a request from a program causing an apparatus to execute a predetermined process;
   a simulator configured to simulate the process executed by the apparatus in accordance with the request;
   an instruction receiver configured to receive a status change instruction for changing a status of the simulator from a user; and
   a status changer configured to cause the simulator to change a status of the simulator in accordance with the status change instruction,
   wherein the simulator simulates the process executed by the apparatus in the status changed by the status changer, and
   wherein the status changer enables execution of another predetermined process, the status of the simulator being changed to simulate the another predetermined process while the process is executed and cancellation of the process is executed.

14. The computer readable media as claimed in claim 13, the functions further comprising:
   a distributer configured to distribute to the status changer information associated with an event occurring in a course of the simulator simulating the process executed by the apparatus,
   wherein the status changer causes the simulator to change the status of the simulator in accordance with the status change instruction at a timing specified based on the information distributed from the distributer.

15. The computer readable media as claimed in claim 14, wherein the distributer refers to a storage storing information indicating events subject to being distributed to the status changer, and distributes to the status changer information associated with a specific one of the events occurring in the course of the simulator simulating the process executed by the apparatus in accordance with the request.

16. The computer readable media as claimed in claim 14, wherein the simulator includes a plurality of components, and the distributer distributes the request received by the request receiver to a component specified by referring to a storage, the storage storing information indicating the request subject to being distributed to each of the components.

17. The computer readable media as claimed in claim 13, the functions further comprising:
   a reporter configured to report to the user information associated with an event occurring in a course of the simulator simulating the process executed by the apparatus.

18. The computer readable media as claimed in claim 13, wherein, when the simulator is an emulator, the emulator operates as the simulator.

* * * * *